(12) United States Patent
Ware et al.

(10) Patent No.: US 11,762,737 B2
(45) Date of Patent: *Sep. 19, 2023

(54) MEMORY COMPONENT WITH ERROR-DETECT-CORRECT CODE INTERFACE

(71) Applicant: Rambus Inc., San Jose, CA (US)

(72) Inventors: Frederick A. Ware, Los Altos Hills, CA (US); Brent S. Haukness, Sunnyvale, CA (US); Lawrence Lai, San Jose, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/956,516

(22) Filed: Sep. 29, 2022

(65) Prior Publication Data

US 2023/0086896 A1 Mar. 23, 2023

Related U.S. Application Data

(63) Continuation of application No. 17/106,663, filed on Nov. 30, 2020, now Pat. No. 11,487,617, which is a continuation of application No. 16/565,848, filed on Sep. 10, 2019, now Pat. No. 10,884,860, which is a continuation of application No. 15/794,164, filed on Oct. 26, 2017, now Pat. No. 10,452,478, which is a continuation of application No. 14/527,422, filed on Oct. 29, 2014, now Pat. No. 9,823,966.

(60) Provisional application No. 62/020,577, filed on Jul. 3, 2014, provisional application No. 61/902,597, filed on Nov. 11, 2013.

(51) Int. Cl.
| | |
|---|---|
| *H03M 13/27* | (2006.01) |
| *H04L 27/34* | (2006.01) |
| *H04L 1/00* | (2006.01) |
| *H03M 13/25* | (2006.01) |
| *G06F 11/10* | (2006.01) |

(52) U.S. Cl.
CPC ...... *G06F 11/1076* (2013.01); *G06F 11/1048* (2013.01)

(58) Field of Classification Search
CPC .................... G06F 11/1076; G06F 11/1048
See application file for complete search history.

(56) References Cited

U.S. PATENT DOCUMENTS

| 5,412,666 A | 5/1995 | Squires et al. |
| 6,591,394 B2 | 7/2003 | Lee et al. |
| (Continued) | | |

*Primary Examiner* — Guy J Lamarre
(74) *Attorney, Agent, or Firm* — The Neudeck Law Firm, LLC

(57) ABSTRACT

A memory component internally generates and stores the check bits of error detect and correct code (EDC). In a first mode, during a read transaction, the check bits are sent to the memory controller along with the data on the data mask (DM) signal lines. In a second mode, an unmasked write transaction is defined where the check bits are sent to the memory component on the data mask signal lines. In a third mode, a masked write transaction is defined where at least a portion of the check bits are sent from the memory controller on the data signal lines coincident with an asserted data mask signal line. By sending the check bits along with the data, the EDC code can be used to detect and correct errors that occur between the memory component and the memory controller.

20 Claims, 13 Drawing Sheets

SEND, VIA A FIRST PLURALITY OF SIGNAL LINES, A FIRST PLURALITY OF DATA BITS FOR STORAGE IN A MEMORY COMPONENT, THE FIRST PLURALITY OF DATA BITS SENT COINCIDENT WITH A DATA MASK SIGNAL DEASSERTED
902

SEND, VIA THE FIRST PLURALITY OF SIGNAL LINES, A FIRST PLURALITY OF CHECK BITS, THE FIRST PLURALITY OF CHECK BITS SENT COINCIDENT WITH SAID DATA MASK SIGNAL ASSERTED
904

(56) References Cited

U.S. PATENT DOCUMENTS

| | | | |
|---|---|---|---|
| 7,831,882 B2 | 11/2010 | Tsern et al. | |
| 8,140,945 B2 | 3/2012 | Cypher | |
| 8,352,805 B2 | 1/2013 | Shaeffer et al. | |
| 9,817,714 B2 | 11/2017 | Halbert et al. | |
| 9,823,966 B1* | 11/2017 | Ware | G06F 11/1076 |
| 9,892,479 B1* | 2/2018 | Pruitt | G06T 1/20 |
| 10,452,478 B2* | 10/2019 | Ware | G06F 11/1048 |
| 10,884,860 B2* | 1/2021 | Ware | G06F 11/1076 |
| 11,487,617 B2* | 11/2022 | Ware | G06F 11/1048 |
| 2004/0210746 A1* | 10/2004 | Hansen | G06F 9/30014 |
| | | | 712/E9.025 |
| 2007/0081451 A1 | 4/2007 | Fujimori et al. | |
| 2008/0082898 A1 | 4/2008 | Nygren et al. | |
| 2009/0327800 A1* | 12/2009 | Kim | G06F 11/1044 |
| | | | 714/5.11 |
| 2011/0066918 A1 | 3/2011 | Ramaraju et al. | |
| 2012/0204079 A1 | 8/2012 | Takefman et al. | |
| 2013/0058145 A1 | 3/2013 | Yu et al. | |
| 2014/0245093 A1 | 8/2014 | Ma et al. | |
| 2015/0378826 A1* | 12/2015 | Zhang | G06F 3/0673 |
| | | | 714/766 |

\* cited by examiner

SEND, VIA A FIRST PLURALITY OF SIGNAL LINES, A FIRST PLURALITY OF COMMAND/ADDRESS BITS AS PART OF A FIRST MEMORY TRANSACTION TO STORE, IN A MEMORY COMPONENT, A FIRST PLURALITY OF DATA BITS TO BE SENT COINCIDENT WITH A DATA MASK SIGNAL DEASSERTED
1002

SEND, VIA THE FIRST PLURALITY OF SIGNAL LINES, A SECOND PLURALITY OF COMMAND/ADDRESS BITS AS PART OF A SECOND MEMORY TRANSACTION TO STORE, IN THE MEMORY COMPONENT, A SECOND PLURALITY OF DATA BITS TO BE SENT COINCIDENT WITH A DATA MASK SIGNAL ASSERTED, THE SECOND PLURALITY OF COMMAND/ADDRESS BITS INCLUDING A FIRST PLURALITY OF CHECK BITS
1004

SEND, VIA A SECOND PLURALITY OF SIGNAL LINES, A SECOND PLURALITY OF CHECK BITS COINCIDENT WITH THE ASSERTED DATA MASK SIGNAL, THE FIRST PLURALITY OF CHECK BITS AND THE SECOND PLURALITY OF CHECK BITS COMPRISING AN EDC ENCODING OF THE SECOND PLURALITY OF DATA BITS
1006

FIGURE 10

```
┌─────────────────────────────────────────────────────────────┐
│  STORE A FIRST PLURALITY OF DATA BITS IN A MEMORY COMPONENT │
│                            1102                             │
└─────────────────────────────────────────────────────────────┘
                               │
┌─────────────────────────────────────────────────────────────┐
│ STORE A CORRESPONDING FIRST PLURALITY OF CHECK BITS IN THE  │
│                     MEMORY COMPONENT                        │
│                            1104                             │
└─────────────────────────────────────────────────────────────┘
                               │
┌─────────────────────────────────────────────────────────────┐
│  RECEIVE, FROM THE MEMORY COMPONENT AND VIA AT LEAST ONE    │
│   DATA MASK SIGNAL LINE, THE FIRST PLURALITY OF CHECK BITS  │
│                            1106                             │
└─────────────────────────────────────────────────────────────┘
                               │
┌─────────────────────────────────────────────────────────────┐
│  RECEIVE, FROM THE MEMORY COMPONENT AND VIA A PLURALITY OF  │
│     DATA SIGNAL LINES, THE FIRST PLURALITY OF DATA BITS     │
│                            1108                             │
└─────────────────────────────────────────────────────────────┘
                               │
┌─────────────────────────────────────────────────────────────┐
│   SEND, TO THE MEMORY COMPONENT AND VIA THE AT LEAST ONE    │
│     DATA MASK SIGNAL LINE, AT LEAST ONE ASSERTED DATA MASK  │
│                           SIGNAL                            │
│                            1110                             │
└─────────────────────────────────────────────────────────────┘
                               │
┌─────────────────────────────────────────────────────────────┐
│   SEND, TO THE MEMORY COMPONENT AND VIA THE PLURALITY OF    │
│     DATA SIGNAL LINES, A SECOND PLURALITY OF CHECK BITS     │
│ COINCIDENT WITH THE AT LEAST ONE ASSERTED DATA MASK SIGNAL, │
│  THE SECOND PLURALITY OF CHECK BITS HAVING BEEN GENERATED   │
│            FROM A SECOND PLURALITY OF DATA BITS             │
│                            1112                             │
└─────────────────────────────────────────────────────────────┘
                               │
┌┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┐
┆ SEND, TO THE MEMORY COMPONENT AND VIA A COMMAND/ADDRESS     ┆
┆  INTERFACE, A THIRD PLURALITY OF CHECK BITS, THE THIRD      ┆
┆ PLURALITY OF CHECK BITS HAVING BEEN GENERATED FROM THE      ┆
┆            SECOND PLURALITY OF DATA BITS                    ┆
┆                            1114                             ┆
└┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┘
```

FIGURE 11

//MEMORY COMPONENT WITH
ERROR-DETECT-CORRECT CODE
INTERFACE

BRIEF DESCRIPTION OF THE DRAWINGS

FIG. 10 is a flowchart illustrating a method of performing a masked write.
FIG. 11 is a flowchart illustrating a method of operating a memory component.

DETAILED DESCRIPTION OF THE
EMBODIMENTS

The following disclosure relates to, among other things, memory components that feature error detection and correction. In an embodiment, a memory component internally generates and stores check bits of an error detect and correct code (EDC). These check bits are used to detect and correct errors when data (including the check bits) is retrieved from the memory cell array. In a first mode (or in response to a command), during a read transaction, the check bits are sent to the memory controller on the data mask (DM) signal lines. In a second mode (or command specified), an unmasked write transaction is defined where the check bits are sent to the memory component using the data on the data mask (DM) signal lines. By sending the check bits along with the data, the EDC code can be used to detect and correct errors that occur between the memory component and the memory controller.

In a third mode (or command specified), a masked write transaction is defined where at least a portion of the check bits are sent to the memory component on the data signal lines coincident with an asserted data mask signal line. In other words, when a unit (e.g., byte) of data is being masked by an asserted data mask signal, the masked data unit is replaced in the transaction by at least some of the check bits.

In an embodiment, a single unit of data (e.g., byte-8-bits) is smaller than the number of check bits required for the EDC code—for example, the 10 EDC bits required for a (266,256) Hamming code. Thus, a single masked unit of data cannot carry all of the EDC bits required. In this embodiment, command/address (C/A) signal lines can be used to send the remaining EDC bits that are not carried by the data lines.

For example, for an 8-bit wide (×8) memory component that is sending/receiving data in 32 byte bursts (for a total of 256 bits), the 32 bytes may be protected by a (266,256) Hamming code. Thus, ten (10) check bits are required. During a masked write, the masked data can be replaced by 8 bits of the EDC code (e.g., EDC code bits numbered 0 to 7). The remaining two bits (e.g., EDC code bits 8 and 9) can be supplied to the memory component as part of the write command using address bits that specify a starting column (e.g., write reorder bits—A[1:0]).

Figure 1:
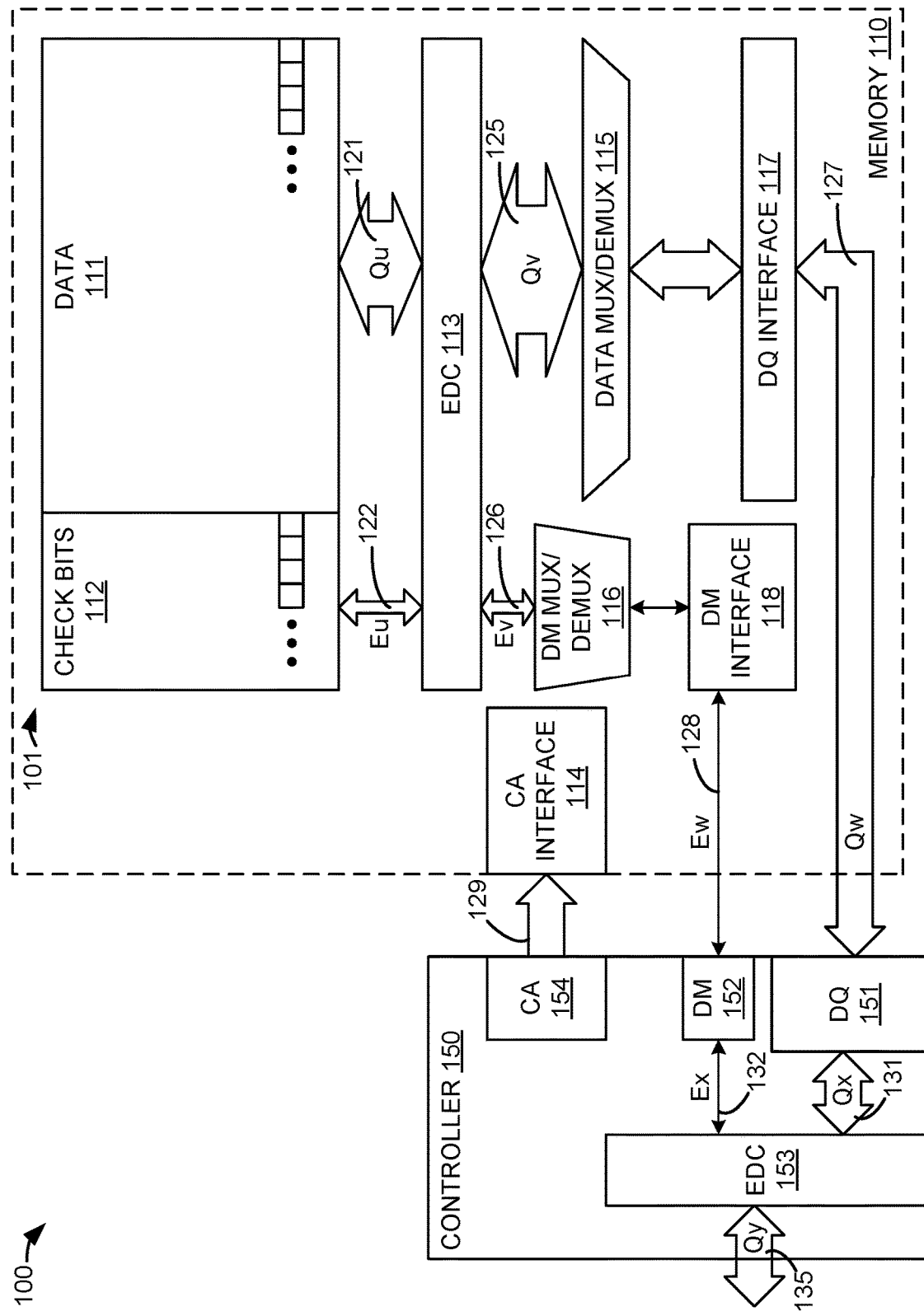
FIG. 1 is a block diagram illustrating a memory system.

FIG. 1 is a block diagram illustrating a memory system. In FIG. 1, memory system 100 comprises controller 150 and memory component 110. Memory component 110 includes storage array 101, error detect and correct block 113, data multiplexer/demultiplexer (mux/demux) 115, data mask mux/demux 116, data interface 117, data mask interface 118, and command address interface 114. Storage array 101 includes memory cells 111 to store data. Storage array 101 includes memory cells 112 to store check bits. Controller 150 includes error detect and correct block 153, data mask interface 152, data interface 151, and command address interface 154.

Controller 150 and memory component 110 may be integrated circuit type devices, such as are commonly referred to as a "chips". A memory controller, such as controller 150, manages the flow of data going to and from memory devices and/or memory modules. Memory 110 may be a standalone device, or may be a component of a memory module. A memory controller can be a separate, standalone chip, or integrated into another chip. For example, a memory controller may be included on a single die with a microprocessor, or included as part of a more complex integrated circuit system such as a block of a system on a chip (SOC).

Controller 150 is operatively coupled to memory 110 via command address interface 154. Controller 150 is operatively coupled to memory 110 to send commands 129 to memory 110. Memory 110 receives the commands 129 (and addresses) via command address interface 114.

Storage array 101 is operatively coupled to EDC 113. Storage array 101 is operatively coupled to EDC 113 to receive data (Qu 121) for storage in memory cells 111. Storage array 101 is operatively coupled to EDC 113 to receive check bits (Eu 122) generated by EDC 113 for storage in memory cells 112. Storage array 101 is operatively coupled to EDC 113 to send data (Qu 121) stored in memory cells 111 to EDC 113 for error detection and correction. Storage array 101 is operatively coupled to EDC 113 to send check bits (Eu 122) stored in memory cells 112 to be used for error detection and correction of data (Qu 121) and check bits (Eu 122).

EDC 113 is operatively coupled to data mux/demux 115 to receive data (Qv 125) for error detection and correction by EDC 113. EDC 113 is operatively coupled to data mask mux/demux 116 to receive check bits (Ev 126) for correcting and detecting errors in data (Qv 125) and check bits (Ev 126). EDC 113 is operatively coupled to data mux/demux 115 to send data (Qv 125) to data mux/demux 115. EDC 113 is operatively coupled to data mask mux/demux 116 to send check bits (Ev 126) to data mask mux/demux 116.

Data mux/demux 115 is operatively coupled to data interface (a.k.a., DQ interface) 117. Data mux/demux 115 is operatively coupled to DQ interface 117 to send multiplexed data (Qw 127) to DQ interface 151 of controller 150. Data mux/demux 115 is operatively coupled to DQ interface 117 to receive multiplexed data (Qw 127) from DQ interface 151 of controller 150. DM mux/demux 116 is operatively coupled to data mask interface (a.k.a., DM interface) 118. DM mux/demux 116 is operatively coupled to DM interface 118 to send multiplexed check bits (Ew 128) to DM interface of controller 150. DM mux/demux 116 is operatively coupled to DM interface 118 to receive multiplexed check bits (Ew 128) from DM interface 152 of controller 150.

DQ interface 151 of controller 150 is operatively coupled to EDC 153. DQ interface 151 of controller 150 is operatively coupled to EDC 153 to send received data (Qx 131)

to EDC 153. DQ interface 151 of controller 150 is operatively coupled to EDC 153 to receive data (Qx 131) to be sent to DQ interface 117 of memory component 110. DM interface 152 of controller 150 is operatively coupled to EDC 153 to send received check bits (Ex 132) to EDC 153. DM interface 152 of controller 150 is operatively coupled to EDC 153 to receive check bits (Ex 132) to be sent to DM interface 118 of memory component 110.

EDC 153 can process received data (Qx 131) and received check bits (Ex 132) to correct and detect errors in received data (Qx 131) and/or received check bits (Ex 132). Data processed (e.g., corrected) by EDC 153 (e.g., data Qy 135), may be output from controller 150. Data receive by controller 150 (e.g., data Qy 135) may be received by EDC 153 for the generation of check bits (Ex 132).

It should be understood that one or more errors may occur in the communication of data between controller 150 and memory 110. In other words, after communication, Qx 131 may not equal Qv 125, and Ex 132 may not equal Ev 126. This may be a result of an error in the communication of multiplexed data Qw 127 and multiplexed check bits Ew 128.

In an embodiment, data Qy 135 is received by controller 150 for storage in memory 110 (i.e., a write transaction/command). Controller 150 provides data Qy 135 to EDC 153 for the generation of check bits Ex 132. Ex 132 and Qx 131 are provided to DM interface 152 and DQ interface 151, respectively. In an embodiment, for a write transaction, the values represented by Qy 135 and Qx 131 are equal.

To write data Qx 131 and check bits Ex 132 to memory 110, controller 150 issues a command 129 to memory 110 via command address interface 154. Memory 110 receives the command 129 via command address interface 114. Controller 150 sends data Qx 131 to memory 110 via data interface 151. Controller sends check bits Ex 132 to memory 110 via data mask interface 152. Controller 150 may multiplex data Qx 131 into multiplexed data Qw 127. Controller 150 may multiplex check bits 132 into multiplexed check bits Ew 128. Multiplexed data Qw 127 and multiplexed check bits 128 may be received by memory 110 via data interface 117 and data mask interface 118, respectively. Data interface 117 communicates multiplexed data Qw 127 to data mux/demux 115 for demultiplexing into data Qv 125. Data mask interface 118 communicates multiplexed check bits Ew 128 to DM mux/dmux 116 for demultiplexing into check bits Ev 126. Data Qv 125 is communicated to EDC 113. Check bits 126 are communicated to EDC 113. EDC 113 may correct and/or detect errors in Data Qv 125 and/or check bits 126.

While being communicated between memory controller 150 and memory 110 (e.g., while being received by DM interface 118 and/or DQ interface 117), data Qw 127 and/or check bits Ew 128 may develop one or more errors. In other words, Qv 125 may not be equal to Qx 131 and/or Ev 126 may not be equal to Ex 132. EDC 113 may correct errors in Qv 125 or check bits 126. EDC 113 may correct errors in Qv 125 before data Qu 125 is written to memory cells 111. EDC 113 may correct errors in Ev 126 before check bits Eu 125 are written to memory cells 112. In an embodiment, EDC 113 can correct a single bit error that has occurred in Qv 125 or Ev 126. In an embodiment, EDC 113 detect two bit errors that have occurred in Qv 125 and signal controller 150 that an uncorrectable error has occurred.

It should be understood that if there is an error in Qv 125 or Ev 126, then the respective Qu 121 or Eu 122 will not be equal to Qv 125 or Ev 126. If there is not an error in either Qv 125 or Ev 126, then Qv 125 will be equal to Qu 121 and Ev 126 will be equal to Eu 122. Data Qu 121 is stored in memory cells 111. Check bits 112 are stored in memory cells 112.

To read data from memory 110, controller 150 issues a command 129 to memory 110 via command address interface 154. Memory 110 receives the command 129 via command address interface 114. Memory 110 retrieves data Qu 121 from memory cells 111 and retrieves check bits Eu 122 from memory cells 112. Memory 110 provides retrieved data Qu 121 and retrieved check bits Eu 122 to EDC 113.

In an embodiment, an error in Qu 121 and/or Eu 122 may occur. EDC 113 may correct errors in Qu 121 or check bits Eu 122. EDC 113 may correct errors in Qu 121 before data Qv 125 is provided to controller 150. EDC 113 may correct errors in Eu 122 before check bits Ev 126 are provided to controller 150. In an embodiment, EDC 113 can correct a single bit error that has occurred in Qu 125 or Eu 126. In an embodiment, EDC 113 can detect that two bit errors have occurred in Qu 125 or Eu 126.

It should be understood that if there is an error in Qu 121 or Eu 122, then the respective Qv 125 or Ev 126 will not be equal to Qu 121 or Eu 122. If there is not an error in either Qu 121 or Eu 122, then Qv 125 will be equal to Qu 121 and Ev 126 will be equal to Eu 122.

Memory 110 multiplexes data Qv 125 and check bits 126. Memory 110 can multiplex data Qv 125 using data mux/demux 115 and send multiplexed data Qw 127 to controller 150 via DQ interface 117. In an embodiment, memory 110 multiplexes data Qv 125 into chunk of 8 bits (i.e., 1 byte) for transmission to controller 150. Memory 110 can multiplex check bits Ev 126 using DM mux/demux 116 and send multiplexed check bits Ew 128 to controller 150 via DM interface 116. In an embodiment, memory 110 multiplexes check bits Ew 125 into chunks of 1 bit each for transmission to controller 150.

While being communicated between memory controller 150 and memory 110 (e.g., while being received by DM interface 152 and/or DQ interface 151), data Qw 127 and/or check bits Ew 128 may develop one or more errors. In other words, Qv 125 may not be equal to Qx 131 and/or Ev 126 may not be equal to Ex 132. EDC 153 may correct errors in Qx 131 or check bits Ex 132. EDC 153 may correct errors in Qx 131 before data Qy 125 is communicated outside of controller 150. In an embodiment, EDC 153 can correct a single bit error that has occurred in Qx 131 or check bits Ex 132. In an embodiment, EDC 153 can detect that two bit errors have occurred in Qu 125 or Eu 126.

It should be understood that if there is an error in Qx 131 or Ex 132, then the respective Qx 131 or Ex 132 will not be equal to Qv 125 or Ev 126. If there is not an error in either Qx 131 or Ex 132, then Qx 131 will be equal to Qv 125 and Ex 132 will be equal to Ev 126.

Figure 2:
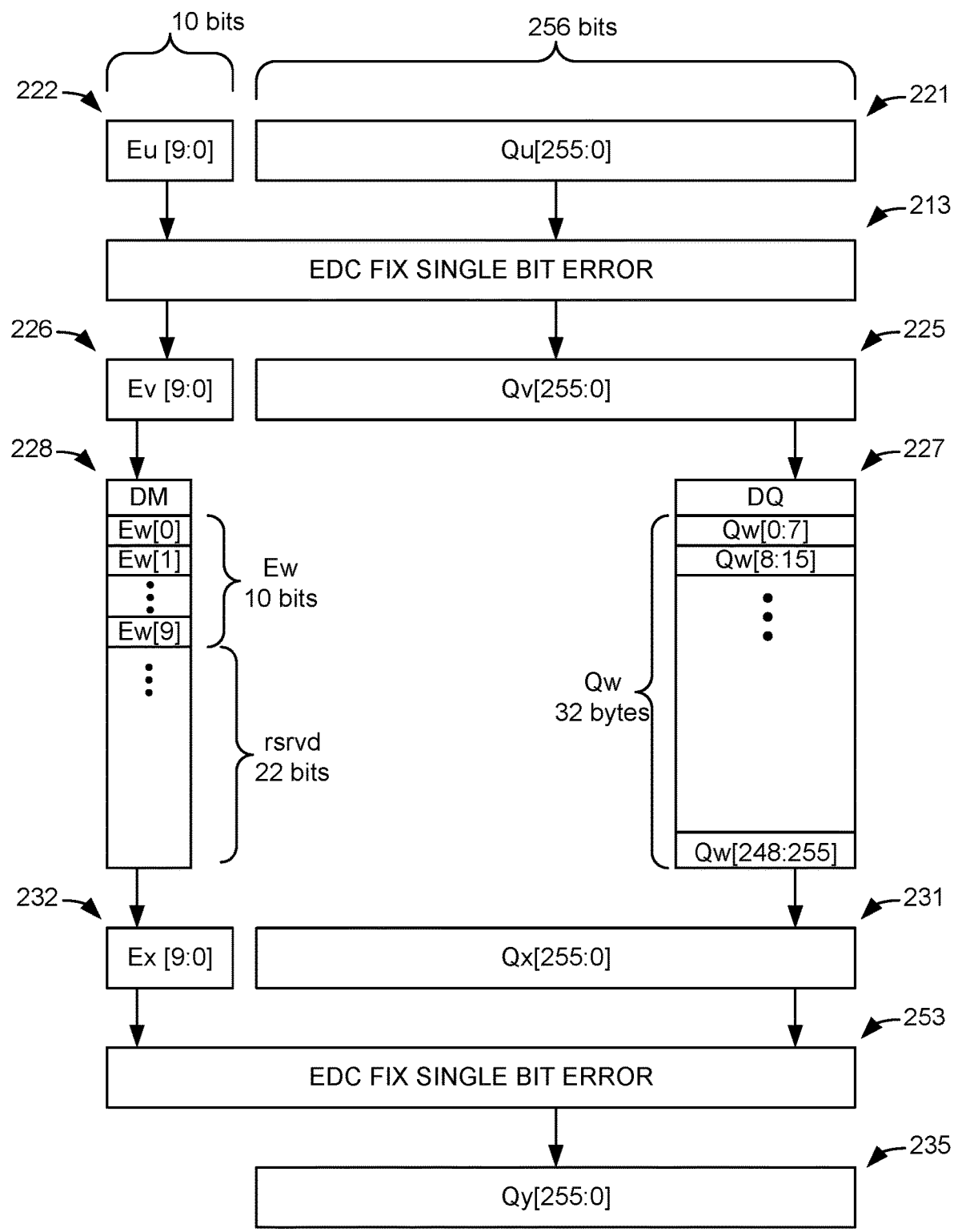
FIG. 2 is a diagram illustrating a memory read.

FIG. 2 is a diagram illustrating a memory read. The operations illustrated in FIG. 2 may be performed by one or more elements of memory system 100. To perform a memory read, data (Qu 221) and check bits (Eu 222) are read from at least one memory array in a memory component (e.g., memory 110). In an embodiment, 256 bits of data and ten (10) check bits are read from the memory array. The data Qu 221 and/or check bits 222 received from the memory array may contain one or more bit errors.

The data Qu 221 and the check bits Eu 222 read from the memory array are provided to error detect and correct (EDC) logic 213. In an embodiment, EDC 213 corrects a single bit error in data Qu 221 or check bits Eu 222. EDC 213 may also be able to detect two or more bit errors in data Qu 221 and check bits Eu 222. The correction of a single bit error in data Qu 221 or check bits 222 results in data Qv 225 and Ev 226.

The corrected data Qv 225 is multiplexed (serialized) into byte wide units (Qw 227) for communication from a memory component (e.g., memory 110) to a controller (e.g., controller 150). The multiplexed data Qw 227 is communicated via the data interface (e.g., DQ interface) of the memory component (and controller).

The corrected check bits Ev 226 are multiplexed (serialized) into single bit wide units (Ew 228) for communication from the memory component to a controller. The multiplexed check bits Ew 228 are communicated from the memory component to the controller via the data mask signal lines (e.g., DM interface) of the memory component (and controller). In an embodiment, each byte of Qw 227 is communicated coincident with a bit on the DM interface.

In an embodiment, data Qw 227 includes 32 bytes (i.e., 256 bits) of data. Accordingly, it takes at least 32 communication intervals to transfer Qw 227 from the memory component to the controller. Since each bit on the DM interface is communicated coincident with a byte of Qw 227 on the DQ interface, there are 32 corresponding communication intervals to transfer a bit on the DM interface from the memory component to the controller. Thus, because Ew 228 is only ten bits, 22 of the communication intervals on the DM interface can be reserved for future use, unused, or allocated to communicate other information.

The 32 bytes of Qw 227 and ten bits of Ew 228 sent by the memory component are received by the controller and deserialized (demultiplexed) into data Qx 231 and check bits Ex 232. The data Qx 231 and check bits Ex 232 received from the memory component may have one or more bit errors that occurred during the communication data Qx 231 and check bits Ex 232.

The data Qx 231 and check bits Ex 232 received from the memory component are provided to error detect and correct (EDC) logic 253. In an embodiment, EDC 253 corrects a single bit error in data Qx 231 and check bits Ex 232. EDC 253 may also be able to detect two or more bit errors in data Qx 231 and check bits Ex 232. The correction of a single bit error in data Qx 231 or check bits Ex 232 results in data Qy 235. Data Qy 235 may be output or otherwise used by the controller.

Figure 3:
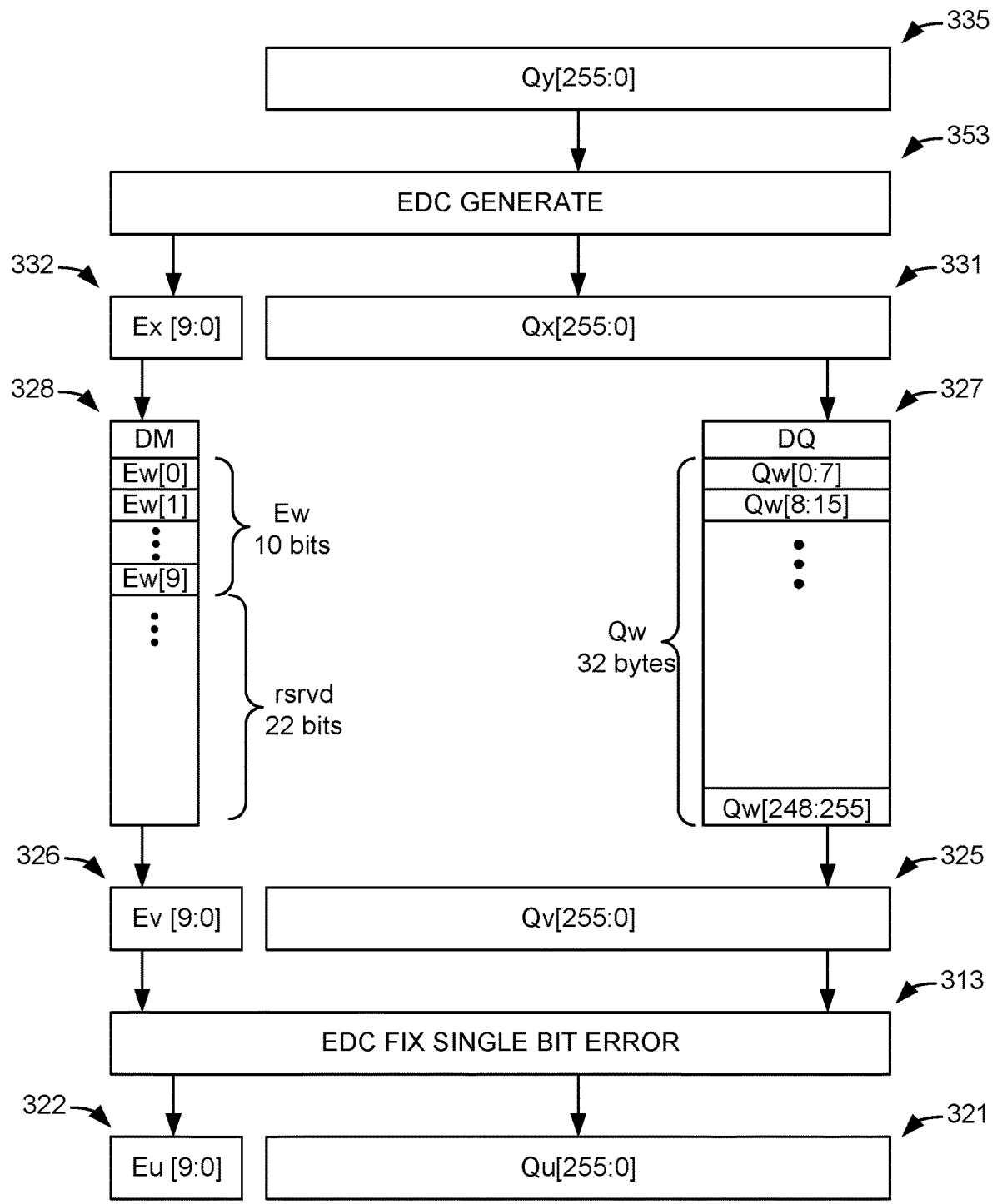
FIG. 3 is a diagram illustrating a memory write.

FIG. 3 is a diagram illustrating a memory write. The operations illustrated in FIG. 3 may be performed by one or more elements of memory system 100. To perform a memory write, data (Qy 335) is provided to a controller (e.g., controller 150). In an embodiment, 256 bits of data (Qy[255:0] 335) are provide to the controller.

The data Qy 335 is provided to EDC generate logic 353. In an embodiment, EDC 353 generates check bits (Ex 332) that allow for the correction of a single bit error. The code generated by EDC 353 may also allow for the detection of two or more bit errors. The generation of check bits Ex 332 from data Qy 335 results in data Qx 331 and check bits Ex 332. Typically, data Qy 335 and data Qx 331 are equal. However, in FIG. 3, Qx 331 is shown as a separate element in order to further illustrate the interdependence of the generated check bits Ex 332 and data Qx 331 in the EDC scheme.

The data Qx 331 is multiplexed (serialized) into byte wide units (Qw 327) for communication from the controller to a memory component. The multiplexed data Qw 327 is communicated via the data interface (e.g., DQ interface) of the controller (and memory component).

The check bits Ex 332 are multiplexed (serialized) into single bit wide units (Ew 328) for communication from the controller to the memory component. The multiplexed check bits Ew 328 is communicated from the controller to the memory component via the data mask signal lines (e.g., DM interface) of the controller (and memory). Each byte of Qw 327 is communicated coincident with a bit on the DM interface.

Qw 327 includes 32 bytes (i.e., 256 bits) of data. Accordingly, it takes at least 32 communication intervals to transfer Qw 227 from the controller to the memory component. Since each bit on the DM interface is communicated coincident with a byte of Qw 227 on the DQ interface, there are 32 corresponding communication intervals to transfer a bit on the DM interface from the controller to the memory component. Thus, because Ew 228 is only ten bits, 22 of the communication intervals on the DM interface can be reserved for future use, unused, or allocated to communicate other information.

The 32 bytes of Qw 327 and ten bits of Ew 328 sent by the controller are received by the memory component and deserialized (demultiplexed) into data Qv 325 and check bits Ev 326. The data Qv 325 and check bits Ev 326 received from the memory component may have one or more bit errors that occurred during the communication of data Qv 325 and check bits Ev 326.

The data Qv 325 and check bits Ev 326 received from the controller are provided to error detect and correct (EDC) logic 313. In an embodiment, EDC 313 corrects a single bit error in data Qv 325 and check bits Ev 326. EDC 313 may also be able to detect two or more bit errors in data Qv 325 and check bits Ev 326. The correction of a single bit error in data Qv 325 or check bits Ev 326 results in data Qu 321 and check bits Eu 322. Data Qv 325 and check bits Ev 326 are stored in at least one memory array.

Figure 4:
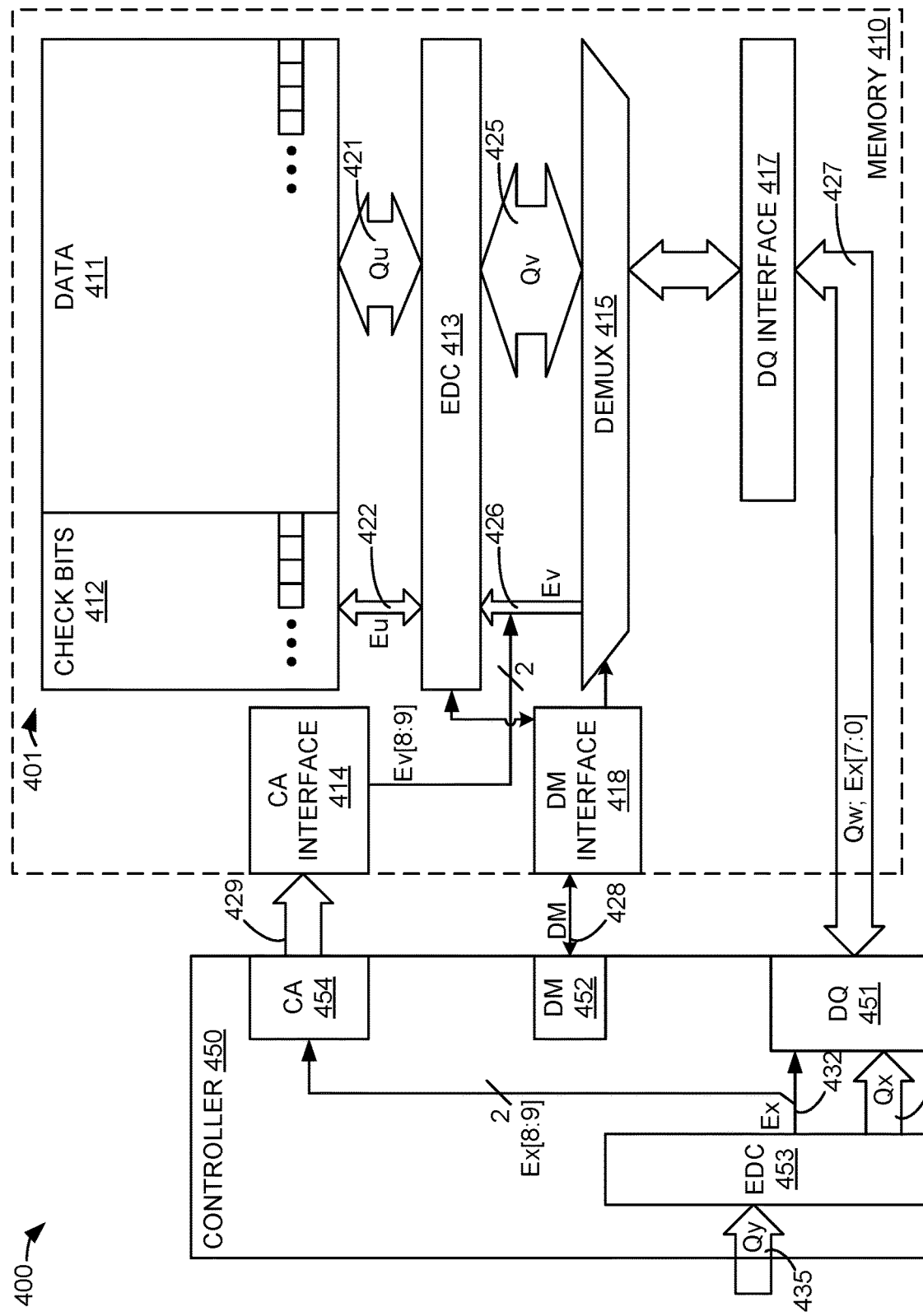
FIG. 4 is a block diagram illustrating a memory system.

FIG. 4 is a block diagram illustrating a memory system. In FIG. 4, memory system 400 comprises controller 450 and memory component 410. Memory 410 includes storage array 401, error detect and correct block 413, demux 415, data interface 417, data mask interface 418, and command address interface 414. Storage array 401 includes memory cells 411 to store data, and memory cells 412 to store check bits. Controller 450 includes error detect and correct block 453, data mask interface 452, data interface 451, and command address interface 454.

Controller 450 is operatively coupled to memory 410 via command address interface 454. Controller 450 is operatively coupled to memory 410 via command address interface 454 to send commands 429 and at least one check bit to memory 410. Memory 410 receives the commands 429, addresses, and at least one check bit via command address interface 414. Memory 410 may receive the at least one check bit via command/address bits that communicate a data ordering during the sending of a read command.

EDC 413 is operatively coupled to demux 415 to receive data (Qv 425) and at least one check bit Ev 426 for error detection and correction by EDC 413. EDC 413 is operatively coupled to CA interface 414 to receive at least one check bit Ev 426 for error detection and correction by EDC 413. In an embodiment, EDC 413 is operatively coupled to demux 415 to receive eight (8) check bits Ev 426 and is operatively coupled to CA interface 414 to receive two (2) check bits for use in error detection and correction.

Demux 415 is operatively coupled to data interface (a.k.a., DQ interface) 417. Demux 415 is operatively coupled to DQ interface 417 to receive multiplexed data and (at least some) check bits (i.e., Qw 427 with at least Ex[7:0]

in at least one communication interval). Demux 415 is operatively coupled to data mask interface (a.k.a., DM interface) 418. Demux 415 is operatively coupled to DM interface 418 to receive data mask signals that cause the masking of data Qw 427 before it is written to storage array 401 (or used by EDC 413 in the calculation of check bits Eu 422). Demux 415 is operatively coupled to DM interface 418 to receive data mask signals that cause the selection of data Qw 427 received coincident with an asserted data mask signal to be provided to EDC 413 as check bits Ev 426.

DQ interface 451 of controller 450 is operatively coupled to EDC 453. DQ interface 451 of controller 450 is operatively coupled to EDC 453 to receive data (Qx 431) and at least some check bits (Ex 432) to be sent to DQ interface 417 of memory 410. DM interface 452 of controller 450 is operatively coupled to send data mask signals 428 coincident with the at least some check bits Ex 432. DM interface 418 of memory 410 is operatively coupled to DM interface 452 of controller 450 to receive at least one data mask signal 428. DM interface 418 of memory 410 is operatively coupled to DM interface 452 of controller 450 to receive at least one data mask signal 428 coincident with the at least some check bits Ex 432 being sent by DQ interface 451 of controller 450.

During read operations, DM interface 452 of controller 450 may be operatively coupled to receive check bits Ev 426. DM interface 418 of memory component 410 may be operatively coupled to DM interface 452 of controller 450 to send check bits Ev 426. DQ interface 452 of controller 450 may be operatively coupled to receive data bits Qv 426. DQ interface 417 of memory component 410 may be operatively coupled to DQ interface 451 of controller 450 to send data bits Qv 425.

Data received by controller 450 (e.g., data Qy 435) may be received by EDC 453 for the generation of check bits (Ex 432). At least some of check bits Ex 432 can be supplied to DQ interface 451 to be multiplexed with data Qx 431 as multiplexed data Qw 427 that is sent to memory 410. For example, one byte of check bits (e.g., Ex[7:0]) may be multiplexed with 31 bytes of data Qx 427. The one byte of check bits Ex[7:0] 432 may be sent during a transmission interval that is coincident with (or corresponds to) an asserted data mask signal 428.

To write data Qx 431 and check bits Ex 432 to memory 410, controller 450 issues a command 429 to memory 410 via command address interface 454. Controller 450 also sends, as part of a command 429, at least some of the check bits (e.g., Ex[9:8]) to memory 410 via command address interface 454. In an embodiment, the check bits sent as part of a command 429 using signal lines which, when the controller is sending a read command, communicate an ordering of data to be output by the memory 410.

For example, in some memory devices, column address lines A[2:0] specify a starting column address for a burst read. During a burst write, however, A[1:0] of these lines are specified as needing to be a valid logic level, but the respective example memory devices ignore the signal levels on these lines. In an embodiment, however, memory 410 and controller 450 use these signal lines A[1:0] during a masked burst write operation to communicate at least some of the check bits (e.g., Ex[9:8]).

Memory 410 receives the command 429 and embedded check bits via command address interface 414. Controller 450 sends data Qx 431 to memory 410 via data interface 451. Controller sends at least some of check bits Ex 432 (e.g., Ex[7:0]) to memory 410 data interface 451. Controller 450 may multiplex data Qx 431 and at least some check bits Ex 432 (e.g., Ex[7:0]) into multiplexed data Qw 427. Multiplexed data and check bits Qw 427 is received by memory 410 via DQ interface 417. DQ interface 417 communicates multiplexed data and check bits Qw 427 to data demux 415 for demultiplexing into data Qv 425 and at least part of check bits Ev 425. Data Qv 425 is communicated to EDC 413. The check bits Ev 426 received from demux 415 and CA interface 414 are communicated to EDC 413. EDC 413 may correct and/or detect errors in data Qv 425 and/or check bits Ev 426.

In an embodiment, since the data being sent by controller Qx 431 has at least some bits that will be masked and replaced by at least some check bits Ex 432, EDC 453 can use a fixed value (e.g., 00000000b) for the replaced and/or masked bits when generating check bits Ex 432. Likewise, EDC 413 can use the fixed value for the replaced and/or masked bits to correct and/or detect errors in data Qv 425 and/or check bits Ev 426.

While being communicated between memory controller 450 and memory 410, multiplexed data and check bits Qw 427 may develop one or more errors. In other words, Qv 425 may not be equal to Qx 431 (taking into account the assumed value for the masked bits) and/or Ev 426 may not be equal to Ex 432. EDC 413 may correct errors in Qv 425 or check bits 426. EDC 413 may correct errors in Qv 425 before data Qu 421 is written to memory cells 411. EDC 413 may correct errors in Ev 426 before check bits Eu 425 are written to memory cells 412. In an embodiment, EDC 413 can correct a single bit error that has occurred in Qv 425 or Ev 426. After correction by EDC, and merging with data from storage array 401 that was masked by data mask signals 428, data Qu 421 is stored in data array 411. Check bits Eu 422 are stored in memory cells 412.

Figure 5:
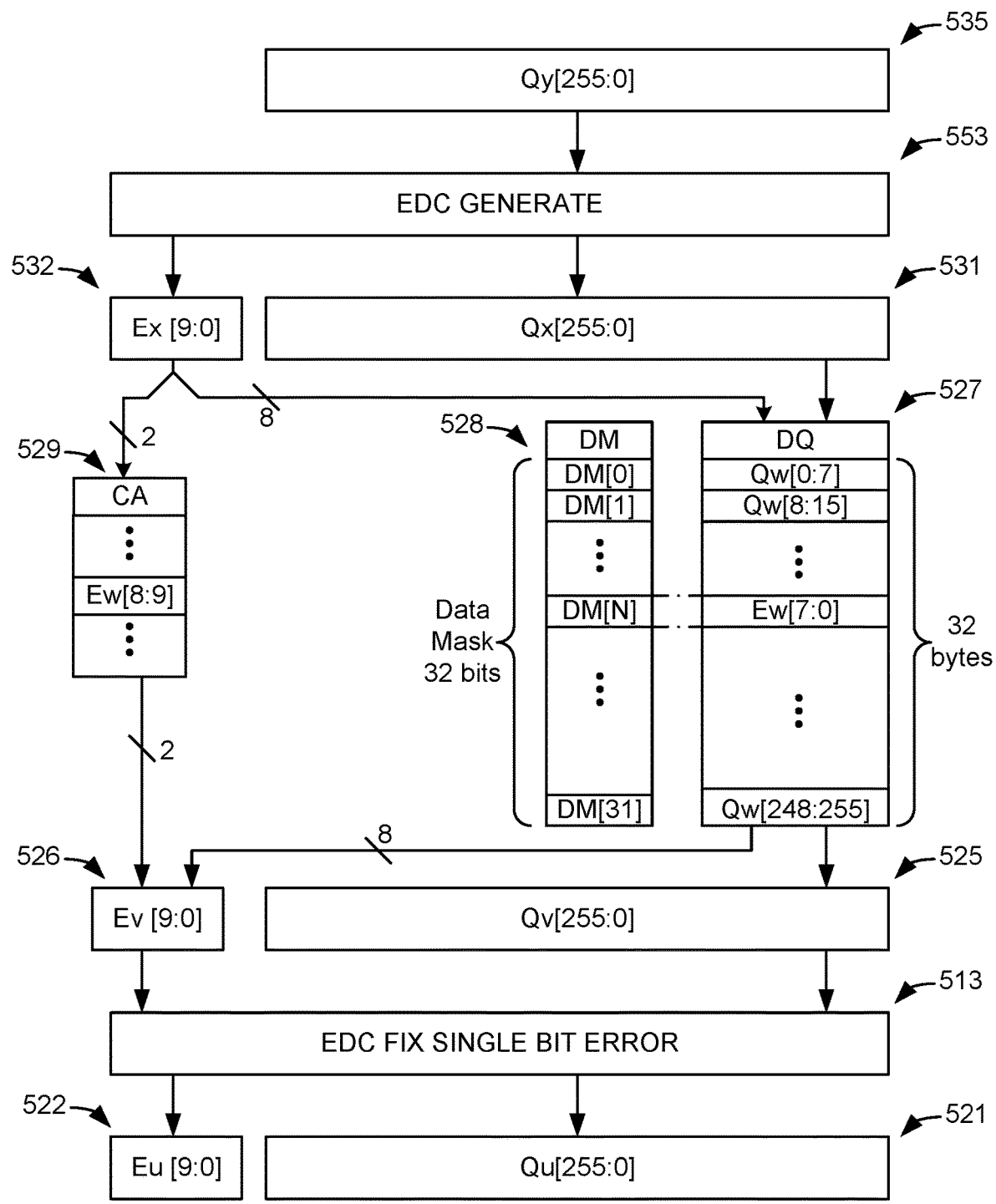
FIG. 5 is a diagram illustrating a masked memory write.

FIG. 5 is a diagram illustrating a masked memory write. The operations illustrated in FIG. 5 may be performed by one or more elements of memory system 400. To perform a memory write, data (Qy 535) is provided to a controller (e.g., controller 450). In an embodiment, 256 bits of data (Qy[255:0] 535) are provide to the controller.

The data Qy 535 is provided to EDC generate logic 553. In an embodiment, the data Qy 535 that is provided to EDC 553 has bits (or bytes) that are to be masked set to a predetermined value (e.g., 0x00h). EDC 553 generates check bits (Ex 532) that allow for the correction of a single bit error. The code generated by EDC 553 may also be able to allow for the detection two or more bit errors. The generation of check bits Ex 532 from data Qy 535 results in data Qx 531 and check bits Ex 532. Typically, data Qy 535 and data Qx 531 are equal. However, in FIG. 5, Qx 531 is shown as a separate element in order to further illustrate the interdependence of the generated check bits Ex 532 and data Qx 531 in the EDC scheme and/or to allow for the masking of bits or bytes to be performed by EDC 553.

The data Qx 531 is multiplexed (serialized) into byte wide units and further multiplexed with a byte (e.g., Ex[7:0]) of check bits Ex 532. The multiplexed data and check bits (Qw 527) is formatted such that the check bits (e.g., Ew[7:0]) embedded in multiplexed data and check bits Qw 527 will be output by the controller coincident with (or corresponding to) an asserted data mask 528 signal. The multiplexed data and check bits Qw 527 is communicated via the data interface (e.g., DQ interface) of the controller (and memory component).

Multiplexed data and check bits Qw 527 includes 31 bytes (i.e., 248 bits) of data and 8 check bits. Accordingly, it takes at least 32 communication intervals to transfer multiplexed data and check bits Qw 527 from the controller to the memory component. At least one of these communication intervals (e.g., DM[N]) has an asserted data mask signal and also corresponds to a communication interval sending check bits Ew[7:0]. This is illustrated in FIG. 5 by the dash-dot lines between signal DM[N] in data mask 528 and Ew[7:0] in multiplexed data and check bits Qw 527.

To perform a write transaction, command 529 is sent to the memory (e.g., memory 410) via a command address interface. The controller also sends, as part of the command 429, at least some of the check bits (e.g., Ex[9:8]) to the memory. In an embodiment, the check bits sent as part of a command 429 using signal lines which, when the controller is sending a read command, communicate an ordering of data to be output by the memory.

For example, in some memory devices, column address lines A[2:0] specify a starting column address for a burst read. During a burst write, however, A[1:0] of these lines are output by the controller at a valid logic level. However, the respective receiving example memory devices ignore the signal levels on these lines. In an embodiment, however, the memory (e.g., memory 410) and controller (e.g., controller 450) use these signal lines A[1:0] during a masked burst write operation to communicate at least some of the check bits (e.g., Ex[9:8]).

The 32 bytes of multiplexed data and check bits Qw 527 and two check bits of Ew[9:8] are received by the memory component are recombined into data Qv 525 and check bits Ev 526. The data Qv 525 and check bits Ev 526 received from the memory component may have one or more bit errors that occurred during the communication and/or reception of data Qv 525 and check bits Ev 526.

The data Qv 525 and check bits Ev 526 received from the controller are provided to error detect and correct (EDC) logic 513. In an embodiment, since the data being sent by controller Qx 531 has at least some bits that will be masked and replaced by at least some check bits Ex 532, EDC 513 can use a fixed value (e.g., 00000000b) for the replaced and/or masked bits to correct and/or detect errors in data Qv 525 and/or check bits 526.

In an embodiment, EDC 513 corrects a single bit error in data Qv 525 and check bits Ev 526. EDC 513 may also be able to detect two or more bit errors in data Qv 525 and check bits Ev 526. The correction of a single bit error in data Qv 525 or check bits Ev 526 results in data Qu 521 and check bits Eu 522. After merging with data from a storage array corresponding to data that was masked by data mask signals 528, the merged data with newly generated check bits may be stored in the storage array of the memory device.

Figure 6:
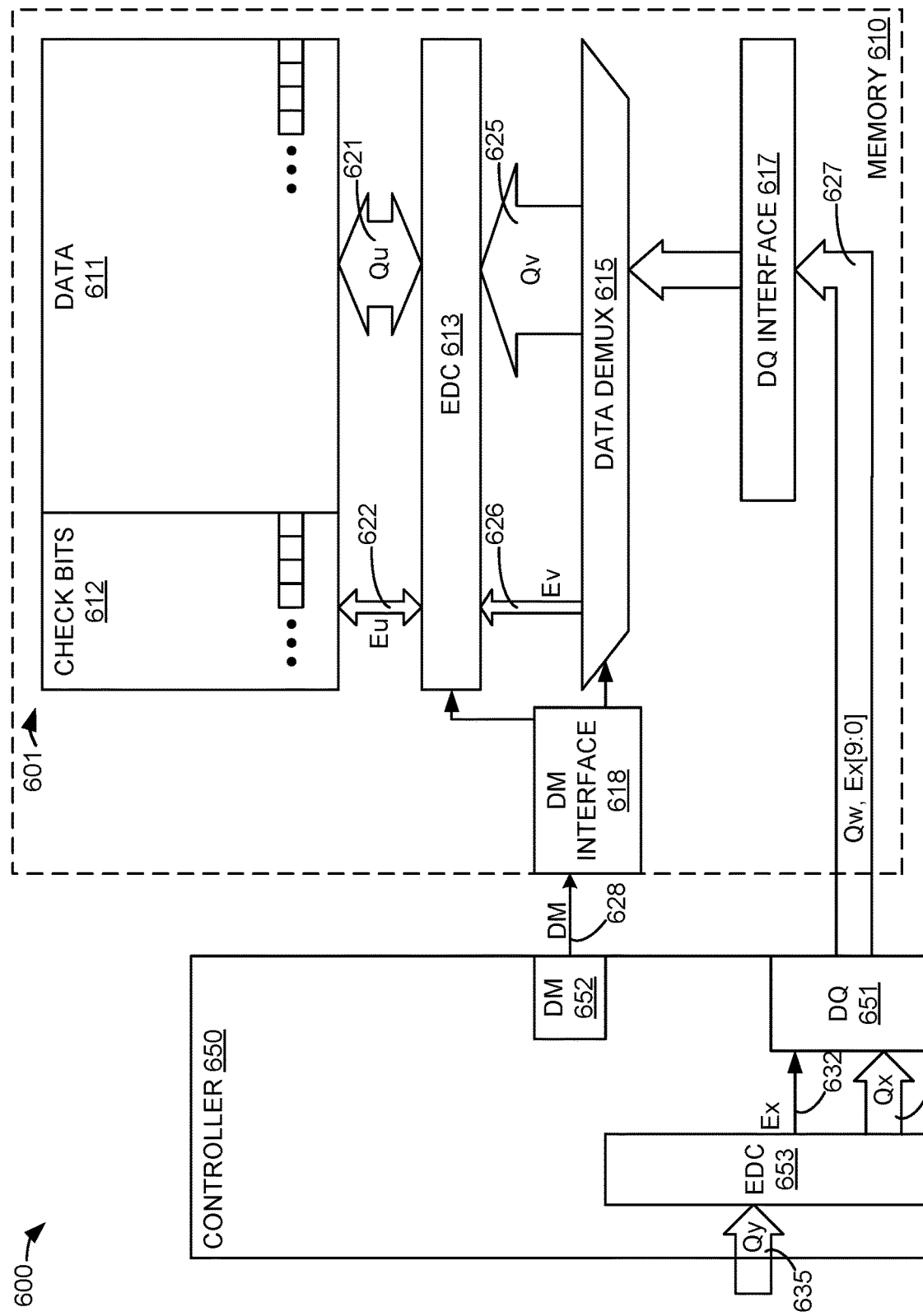
FIG. 6 is a block diagram illustrating a memory system.

FIG. 6 is a block diagram illustrating a memory system. In FIG. 6, memory system 600 comprises controller 650 and memory component 610. Memory component 610 includes storage array 601, error detect and correct block 613, demux 615, data interface 617, and data mask interface 618, Storage array 601 includes memory cells 611 to store data and memory cells 612 to store check bits. Controller 650 includes error detect and correct block 653, data mask interface 652, and data interface 651.

Controller 650 is operatively coupled to memory 610. Controller 650 is operatively coupled to memory 610 to send commands, data, and at least one check bit to memory 610. Memory 610 receives the commands, addresses, and at least one check bit. Memory 610 may receive the data and the at least one check bit via a data interface (DQ 617). Memory 610 may receive the at least one check bit(s) via the data interface coincident with (or corresponding to) asserted data mask signals received via DM interface 618.

EDC 613 is operatively coupled to demux 615 to receive data (Qv 625) and at least one check bit Ev 626 for error detection and correction by EDC 613. In an embodiment, EDC 613 is operatively coupled to demux 615 to receive ten (10) check bits Ev 626 for use in error detection and correction.

Demux 615 is operatively coupled to data interface (a.k.a., DQ interface) 617. Demux 615 is operatively coupled to DQ interface 617 to receive multiplexed data and check bits (i.e., Qw 427 with Ex[9:0]). Demux 615 is operatively coupled to data mask interface (a.k.a., DM interface) 618. Demux 615 is operatively coupled to DM interface 618 to receive data mask signals that cause the masking of data Qw 627 before it is written to storage array 601 (or used by EDC 613 in the calculation of check bits Eu 622). Demux 615 is operatively coupled to DM interface 618 to receive data mask signals that cause the selection of data Qw 627 received coincident with an asserted data mask signal to be provided to EDC 613 as check bits Ev 626.

DQ interface 651 of controller 650 is operatively coupled to EDC 653. DQ interface 651 of controller 650 is operatively coupled to EDC 653 to receive data (Qx 431) and check bits (Ex 632) to be sent to DQ interface 617 of memory component 610. DM interface 652 of controller 650 is operatively coupled to send data mask signals 628 coincident with the check bits Ex 632. DM interface 618 of memory component 610 is operatively coupled to DM interface 652 of controller 650 to receive at least one data mask signal 628. DM interface 618 of memory component 610 is operatively coupled to DM interface 652 of controller 650 to receive at least one data mask signal 628 coincident with the check bits Ex 632 being sent by DQ interface 651 of controller 650.

Data received by controller 650 (e.g., data Qy 635) may be received by EDC 653 for the generation of check bits (Ex 632). At least some of check bits Ex 632 can be supplied to DQ interface 651 to be multiplexed with data Qx 631 to become multiplexed data and check bits Qw 627 which is sent to memory component 610. For example, one byte of check bits (e.g., Ex[7:0]) may be multiplexed in one communication interval, with two bits of a second byte in a second communication interval, with 30 bytes of data Qx 631. The first and second bytes holding the check bits Ex[9:0] 632 may be sent during transmission intervals that are coincident with (or correspond to) asserted data mask signals 428.

To write data Qx 631 and check bits Ex 632 to memory 610, controller 650 issues a command to memory 610 via a command address interface. Memory 610 receives the command via a command address interface. Controller 650 sends data Qx 631 to memory 610 via data interface 651. Controller also sends check bits Ex 632 (e.g., Ex[9:0]) to memory 610 via data interface 651. Controller 650 multiplexes data Qx 631 and check bits Ex 632 (e.g., Ex[9:0] are multiplexed with byte serialized data Qx 631.) Multiplexed data and check bits Qw 627 is received by memory 610 via DQ interface 617. DQ interface 617 communicates multiplexed data and check bits Qw 627 to data demux 615 for demultiplexing into data Qv 625 and check bits Ev 625. Data Qv 625 and check bits Ev 626 are communicated to EDC 613. EDC 613 may correct and/or detect errors in data Qv 625 and/or check bits 626.

In an embodiment, since the data being sent by controller Qx 631 has at least some bits that will be masked and replaced by at least some check bits Ex 632, EDC 653 can use a fixed value (e.g., 00000000b) for the replaced and/or masked bits when generating check bits Ex 632. Likewise, EDC 613 can use the fixed value for the replaced and/or masked bits to correct and/or detect errors in data Qv 625 and/or check bits 626.

While being communicated between memory controller 650 and memory 610, multiplexed data and check bits Qw 627 may develop one or more errors. In other words, Qv 625 may not be equal to Qx 631 (taking into account the assumed value for the masked bits) and/or Ev 626 may not be equal to Ex 632. EDC 613 may correct errors in Qv 625 or check bits 626. EDC 613 may correct errors in Qv 625 before data Qu 621 is written to memory cells 611. EDC 613 may correct errors in Ev 626 before check bits Eu 625 are written to memory cells 612. In an embodiment, EDC 613 can correct a single bit error that has occurred in Qv 625 or Ev 626. After correction by EDC, and merging with data from storage array 601 that was masked by data mask signals 628, data Qu 621 is stored in data array 611. Check bits Eu 622 are stored in memory cells 612.

Figure 7A:
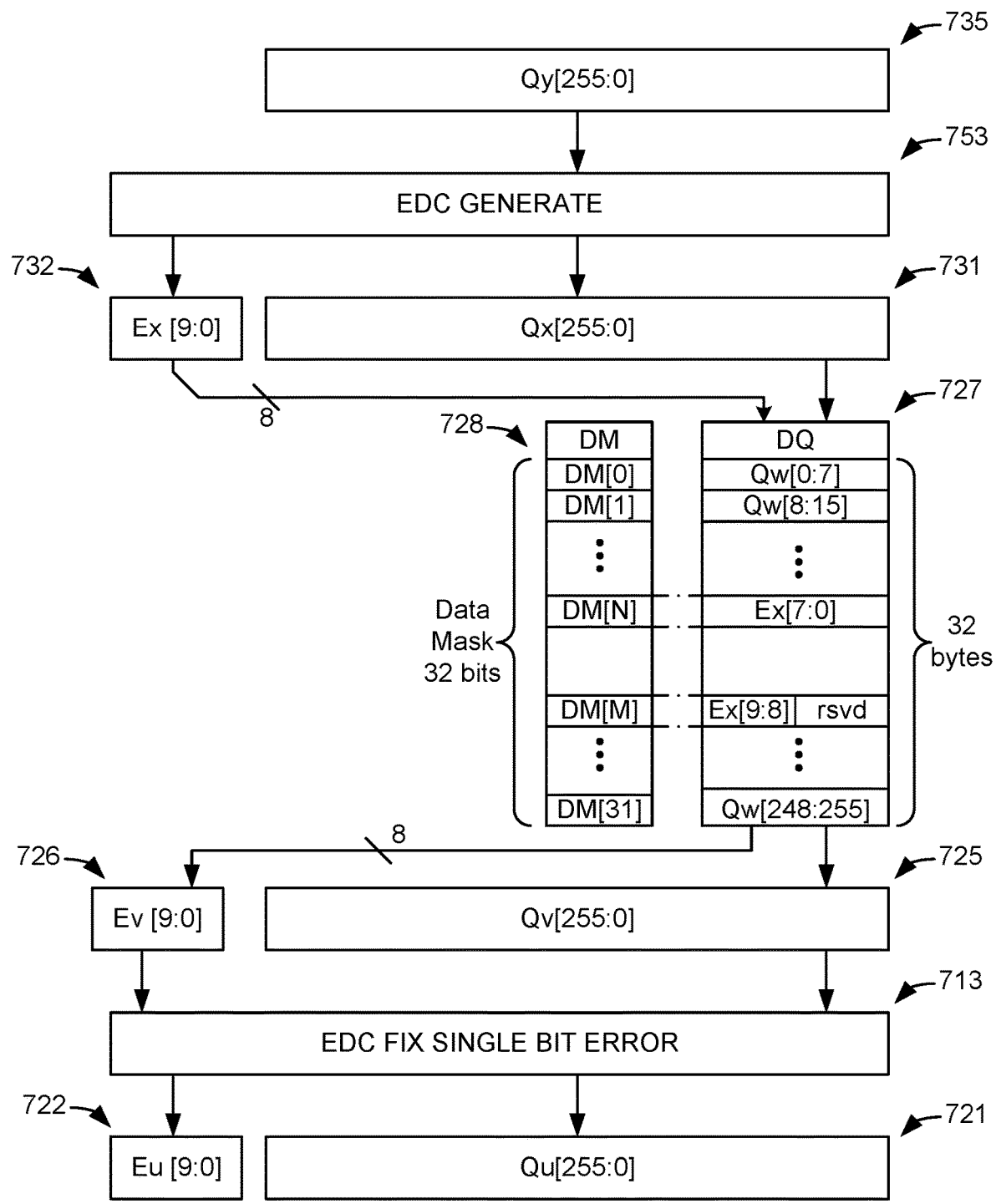
FIGS. 7A and 7B are diagrams illustrating a masked memory write.
Figure 7B:
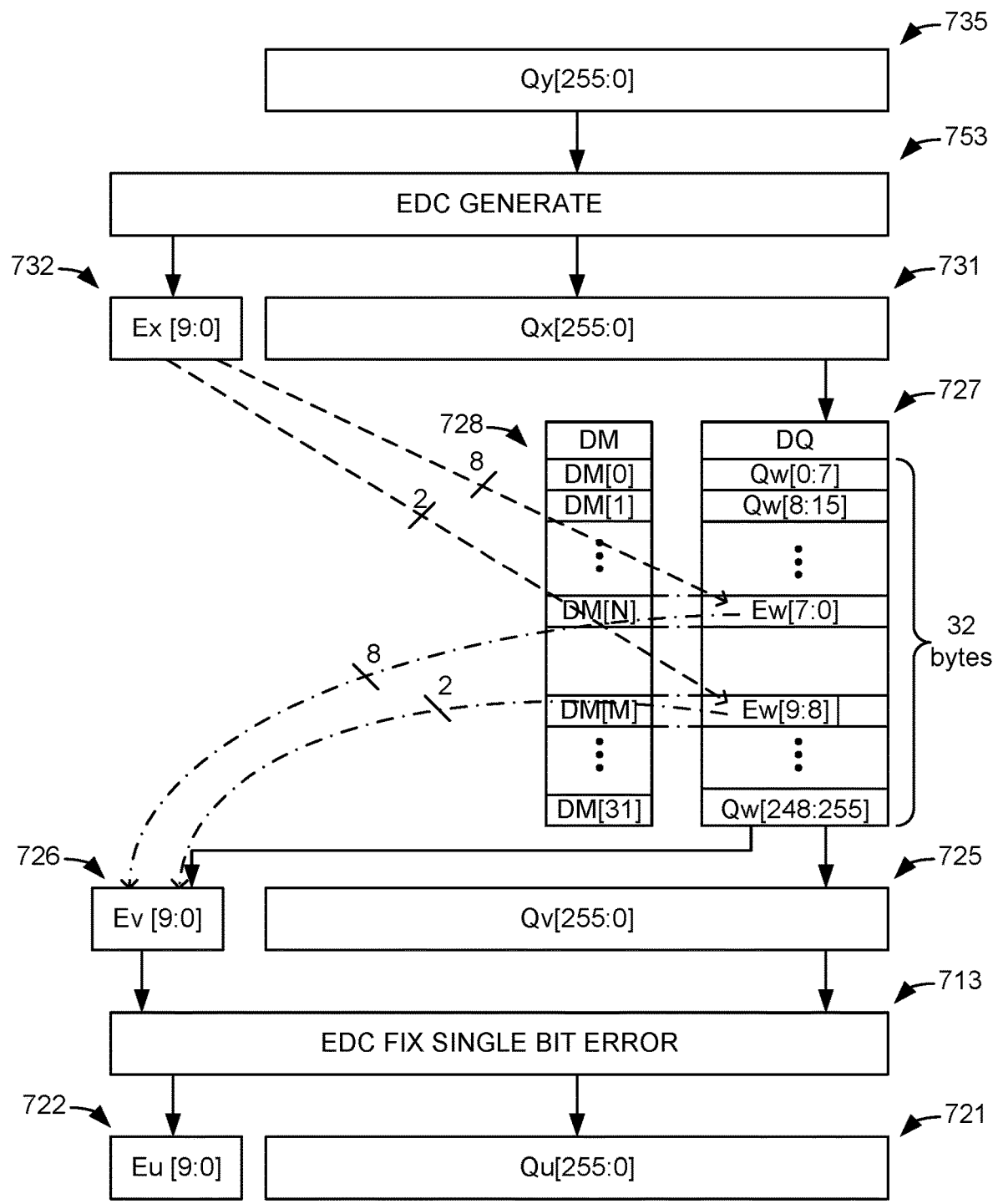

FIGS. 7A and 7B are diagrams illustrating a masked memory write. The operations illustrated in FIGS. 7A and 7B may be performed by one or more elements of memory system 600. To perform a memory write, data (Qy 735) is provided to a controller (e.g., controller 650). In an embodiment, 256 bits of data (Qy[255:0] 735) are provide to the controller.

The data Qy 735 is provided to EDC generate logic 753. In an embodiment, the data Qy 735 that is provided to EDC 753 has bits (or bytes) that are to be masked set to a predetermined value (e.g., 0x00h). EDC 753 generates check bits (Ex 732) that allow for the correction of a single bit error. The code generated by EDC 753 may also be able to allow for the detection two or more bit errors. The generation of check bits Ex 732 from data Qy 735 results in data Qx 731 and check bits Ex 732. Typically, data Qy 735 and data Qx 731 are equal. However, in FIGS. 7A and 7B, Qx 731 is shown as a separate element in order to further illustrate the interdependence of the generated check bits Ex 732 and data Qx 731 in the EDC scheme and/or to allow for the masking of bits or bytes to be performed by EDC 753.

The data Qx 731 is multiplexed (serialized) into byte wide units and further multiplexed with a first byte and a second byte that include check bits Ex 732 (e.g., Ex[7:0] and Ex[9:8], Ex[0:4] and Ex[5:9], etc.) The multiplexed data and check bits (Qw 727) is formatted such that the first and second bytes containing check bits Ex 732 are embedded in the multiplexed data such that the first and second bytes containing check bits Ex 732 will be output by a controller coincident with (or corresponding to) an asserted data mask 728 signal. The multiplexed data and check bits Qw 727 is communicated via the data interface (e.g., DQ interface) of the controller (and memory component).

Multiplexed data and check bits Qw 727 includes 30 bytes (i.e., 240 bits) of data, 10 check bits, and 6 reserved, unused, or unallocated bits. Accordingly, it takes at least 32 communication intervals to transfer multiplexed data and check bits Qw 727 from the controller to the memory component. At least two of these communication intervals (e.g., DM[N] and DM[M]) have asserted data mask signals and also correspond to a communication intervals that send check bits Ew[9:0]. This is illustrated in FIG. 7A by the dash-dot lines between signal DM[N] and DM[M] in data mask 728 and Ew[9:0] and Ew[9:8], respectively, in multiplexed data and check bits Qw 727. This is illustrated, in part, in FIG. 7B by the dashed lines between signal Ex 732 and Ew[7:0] and Ew[9:8] in multiplexed data and check bits 727.

The 32 bytes of multiplexed data and check bits Qw 727 are received by the memory component are recombined into data Qv 725 and check bits Ev 726. This is, in part, illustrated in FIG. 7B by the dash-dot lines from Ew[7:0] and Ew[9:8] in multiplexed data and check bits 727 to Ev[9:0] 726.

The data Qv 725 and check bits Ev 726 received from the memory component may have one or more bit errors that occurred during the communication and/or reception of data Qv 725 and check bits Ev 726. The data Qv 725 and check bits Ev 726 received from the controller are provided to error detect and correct (EDC) logic 713. In an embodiment, since the data being sent by controller Qx 731 has at least some bits that will be masked and replaced by at least some check bits Ex 732, EDC 713 can use the fixed value (e.g., 00000000b) for the replaced and/or masked bits to correct and/or detect errors in data Qv 725 and/or check bits 726.

In an embodiment, EDC 713 corrects a single bit error in data Qv 725 and check bits Ev 726. EDC 713 may also be able to detect two or more bit errors in data Qv 725 and check bits Ev 726. The correction of a single bit error in data Qv 725 or check bits Ev 726 results in data Qu 721 and check bits Eu 722. After merging with data from a storage array corresponding to data that was masked by data mask signals 728, the merged data with newly generated check bits may be stored into the storage array of the memory device.

Figure 8:
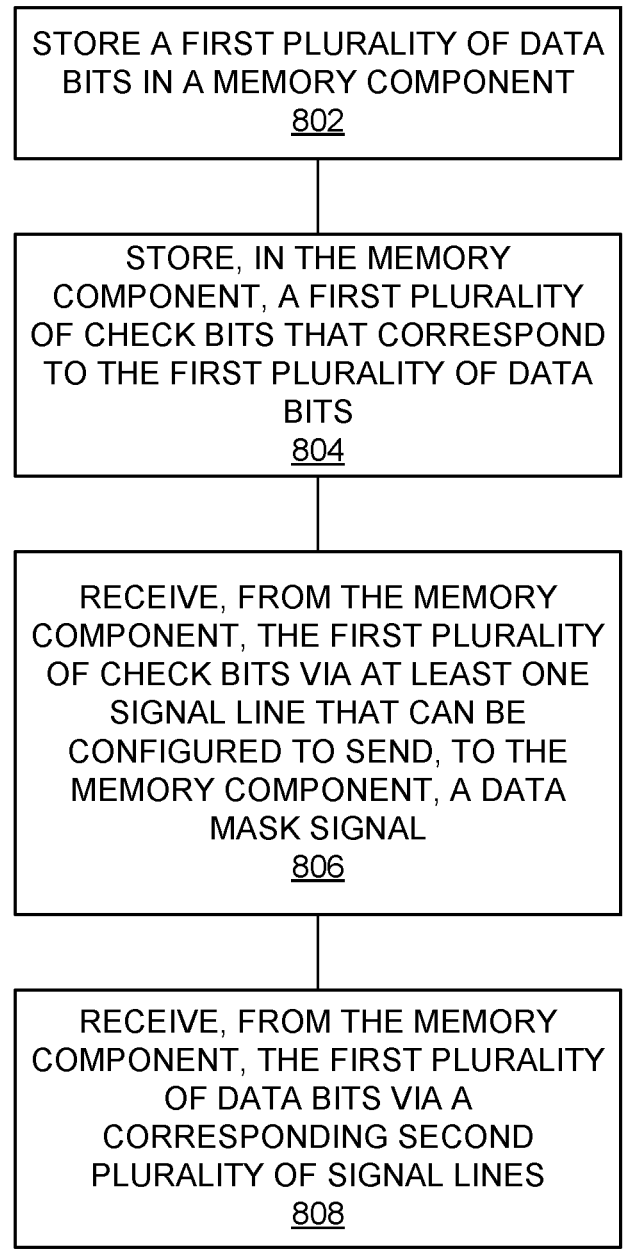
FIG. 8 is a flowchart illustrating a method of operating a memory system.

FIG. 8 is a flowchart illustrating a method of operating a memory system. The steps illustrated in FIG. 8 may be performed by one or more elements of memory system 100, memory system 400, and/or memory system 600. For example, memory system 100, memory system 400, and/or memory system 600 can be configured (by a command or mode) to function like one or more of memory system 100, memory system 400, and/or memory system 600, and vice versa. A first plurality of data bits are stored in a memory component (802). For example, controller 150 may issue one or more write commands to memory 110. As part of these write transaction, memory 110 may store data received from controller 150 in storage array 101 (and memory cells 111, in particular.) The stored data may include a plurality of bits (e.g., 256 bits of Qu 121.)

A first plurality of check bits that correspond to the first plurality of data is stored in the memory component (804). For example, as part of the write transaction, memory 110 may also store check bits in storage array 101 (and memory cells 112, in particular.) These check bits (e.g., 10 bits of Eu 122) may be encoded with a SECDED error code that was generated to protect the first plurality of bits (e.g., Qu 121).

From the memory component, the first plurality of check bits are received via at least one signal line that can be configured to send, to the memory component, a corresponding at least one data mask signal (806). For example, controller 150 can issue a read command to read data and check bits previously stored in storage array 101. As part of this read transaction, memory 110 can provide the check bits stored in the storage array 101 to controller 150 via a data mask signal line. Controller 150 may receive a plurality of check bits from memory 110 on a single data mask signal line in a serial manner. If controller 150 is reading a memory module comprised of multiple memories 110, controller 150 may receive check bits via a plurality of data mask signal lines.

From the memory component, the first plurality of data bits are received via a corresponding second plurality of signal lines (808). For example, as part of the read transaction, memory 110 can provide data bits stored in the storage array 101 (which correspond to the check bits provided on the data mask signal line) to controller 150 via memory 110's data signal lines (i.e., DQ signal lines).

A second plurality of check bits can be sent to the memory component via the corresponding at least one signal line. These second plurality of check bits being generated from a second plurality of data bits. For example, controller 150 may perform an unmasked write command that uses the data mask signal lines to send the check bits to memory 110. Controller 150 may place memory 110 in a mode that specifies the data mask signal lines are to be used to send and/or receive check bits rather than data mask signals. Controller 150 may send memory 110 a command that specifies the data mask signal lines are to be used to send and/or receive check bits rather than data mask signals.

At least one asserted data mask signal can be sent to the memory component via the corresponding at least one signal line. A second plurality of check bits can be sent to the memory component coincident with at least one asserted data mask signal. The second plurality of check bits can be sent via the first plurality of signal lines. The second plurality of check bits being generated from a second plurality of data bits. For example, controller 450 may perform a masked write command that uses the data mask signal lines to send a data mask signal to memory 410. As part of this write command, controller 450 may send the check bits on the data signal lines (i.e., DQ signal lines) during a communication interval that corresponds to an asserted data mask signal. Controller 450 may place memory 410 in a mode that specifies the data mask signal lines are to be used to send data mask signals. Controller 450 may place memory 410 in a mode that specifies the data lines are to carry check bits when the data mask signal line is asserted. Controller 450 may send memory 410 a command that specifies the data lines are to carry check bits when the data mask signal line is asserted.

A third plurality of check bits are sent to the memory component via a command/address interface. The third plurality of check bits are generated from the second plurality of data bits. For example, controller 450 may send to memory 110 at least one check bit as part of a write command. Controller 450 may send, as part of this write command, at least some of the check bits (e.g., Ex[9:8]) to memory 410 via the command address signal lines. The check bits sent as part of a the write command may be sent using signal lines which, when the controller is sending a read command, communicate an ordering of data to be output by memory 410.

An error in data bits received via the second plurality of signal lines can be corrected using the second plurality of check bits received via the corresponding at least one signal line. The second plurality of check bits being generated from the second plurality of data bits. For example, controller 450 may correct an error in the data it receives from memory 410 using the check bits controller 450 received via the data mask signal line.

Figure 9:
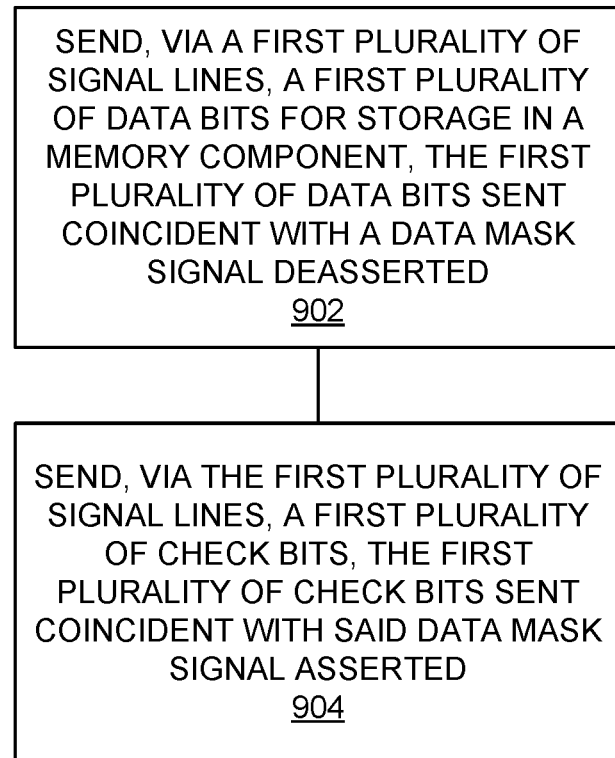
FIG. 9 is a flowchart illustrating a method of operating a memory component.

FIG. 9 is a flowchart illustrating a method of operating a memory component. The steps illustrated in FIG. 9 may be performed by one or more elements of memory system 100, memory system 100, memory system 400, and/or memory system 600. For example, memory system 100, memory system 400, and/or memory system 600 can be configured (by a command or mode) to function like one or more of memory system 100, memory system 400, and/or memory system 600, and vice versa. Via a first plurality of signal lines, a first plurality of data bits are sent for storage in a memory component. This first plurality of data bits are sent coincident with a data mask signal deasserted (902). For example, controller 450 may send data to memory component 410 via data signal lines (i.e., DQ signal lines). A deasserted data mask signal sent coincident with this data indicates that memory component 410 is to store this data.

Via the first plurality of signal lines, a first plurality of check bits are sent coincident with the data mask signal asserted (904). For example, controller may send check bits to memory component 410 via the data signal lines. An asserted data mask signal sent coincident with this data indicates that memory component 410 is not to store this data. The asserted data mask signal also indicates that memory component 410 is to use the data on the data signal lines as check bits. These check bits can be used by memory component 410 to correct data received during other portions the write transaction (e.g., portions with the data mask signal deasserted.)

FIG. 10 is a flowchart illustrating a method of performing a masked write. The steps illustrated in FIG. 10 may be performed by one or more elements of memory system 100, memory system 100, memory system 400, and/or memory system 600. For example, memory system 100, memory system 400, and/or memory system 600 can be configured (by a command or mode) to function like one or more of memory system 100, memory system 400, and/or memory system 600, and vice versa. Via a first plurality of signal lines, a first plurality of command/address bits are sent as part of a first memory transaction to store, in a memory component, a first plurality of data bits. The first plurality of data bits to be sent coincident with a data mask signal deasserted (1002). For example, controller 450 may send via CA interface 454 a first write command to write data that is not masked.

Via the first plurality of signal lines, a second plurality of command/address bits are sent as part of a second memory transaction to store, in the memory component, a second plurality of data bits. The second plurality of data bits to be sent coincident with a data mask signal asserted. The second plurality of command/address bits including a first plurality of check bits (1004). For example, controller 450 may send via CA interface 454 a second write command to write data. This second write command also contains at least one check bit that can be used to check/correct the data associated with the second write command. This second write command is to include communication intervals with masked data.

Via the second plurality of signal lines, a second plurality of check bits is sent coincident with the asserted data mask signal. The first plurality of check bits and the second plurality of check bits comprising an EDC encoding of the second plurality of data bits (1006). For example, controller 450 may send, on the data lines and as part of the write transaction associated with the second write commend, check bits to memory 410 during a communication interval that has masked data. The check bits sent via the data lines, and the check bits sent via the command/address lines, comprise an EDC encoding for the detection/correction of errors in the data associated with the second write command.

FIG. 11 is a flowchart illustrating a method of operating a memory component. The steps illustrated in FIG. 11 may be performed by one or more elements of memory system 100, memory system 100, memory system 400, and/or memory system 600. For example, memory system 100, memory system 400, and/or memory system 600 can be configured (by a command or mode) to function like one or more of memory system 100, memory system 400, and/or memory system 600, and vice versa. A first plurality of data bits are stored in a memory component (1102). For example, memory component 110 may store data bits Qu 121 in memory cells 111. A second plurality of check bits are stored in the memory component (1104). For example, memory component 110 may store check bits Eu 122 in memory cells 112.

From the memory component, and via at least one data mask signal line, the first plurality of check bits are received (1106). For example, controller 150 may receive check bits Ev 126 from memory component 110 via DM interface 152. From the memory component, and via a plurality of data signal lines, the first plurality of data bits is received (1108). For example, controller 150 may receive data bits Qv 125 from memory component 110 via DQ interface 151.

To the memory component, and via the at least one data mask signal line, at least one asserted data mask signal is sent (1110). For example, controller 450 (i.e., controller 150 configured as controller 450) while performing a write transaction, may send an asserted data mask signal 428 to memory 110 via DM interface 452. To the memory component, and via the plurality of data signal lines, a second plurality of check bits are sent coincident with the at least one asserted data mask signal. The second plurality of check bits having been generated from a second plurality of data bits (1112). For example, controller 450, while performing the write transaction, may send at least a portion of check bits Ex 432 (e.g., Ex[7:0]) to memory 410 via DQ interface 451 coincident with an asserted data mask signal 428 sent via DM interface 452.

Optionally, to the memory component, and via a command/address interface, a third plurality of check bits are sent. The third plurality of check bits having been generated from the second plurality of data bits (1114). For example, check bits Ex[9:8] may be sent by controller 450 to memory 410 as part of a command sent via CA interface 454.

The systems and devices described above may be implemented in computer systems, integrated circuits, or stored by computer systems. The systems described above may also be stored on a non-transitory computer readable medium. Devices, circuits, and systems described herein may be implemented using computer-aided design tools available in the art, and embodied by computer-readable files containing software descriptions of such circuits. This includes, but is not limited to, one or more elements of memory system 100, memory system 400, and memory system 600, and their components. These software descriptions may be: behavioral, register transfer, logic component, transistor, and layout geometry-level descriptions. Moreover, the software descriptions may be stored on non-transitory storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, Blu-Ray, and so on.

Figure 12:
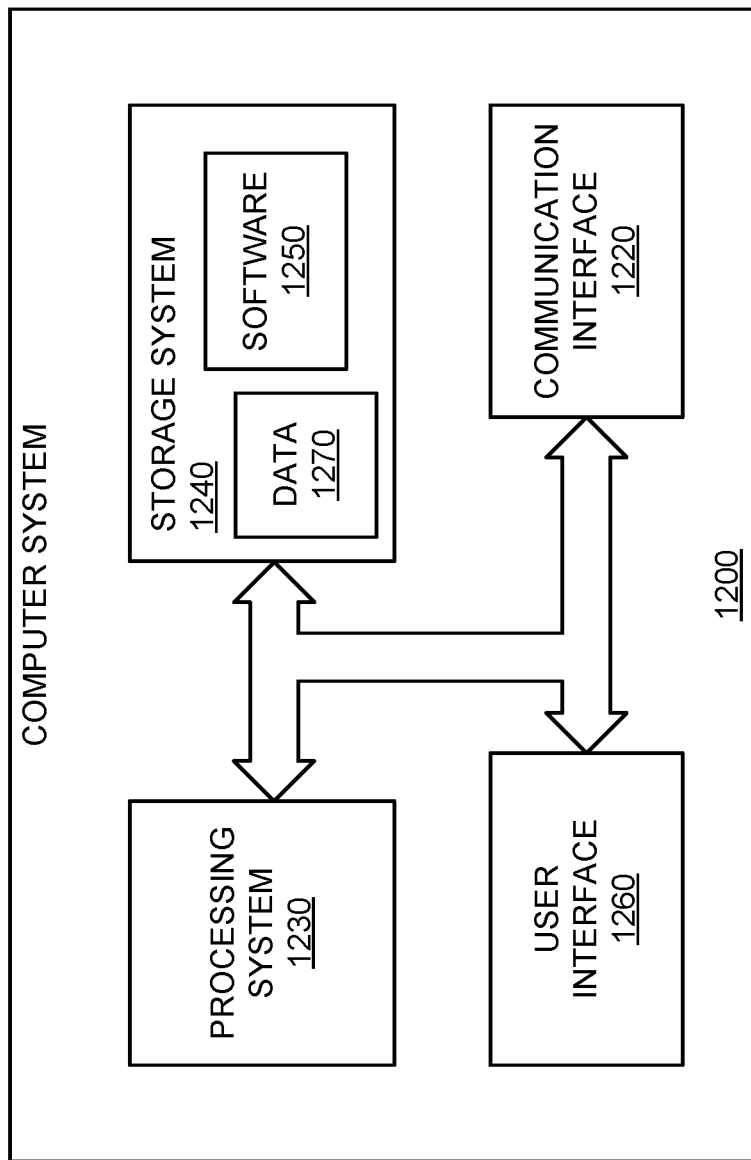
FIG. 12 is a block diagram of a computer system.

FIG. 12 illustrates a block diagram of a computer system. Computer system 1200 includes communication interface 1220, processing system 1230, storage system 1240, and user interface 1260. Processing system 1230 is operatively coupled to storage system 1240. Storage system 1240 stores software 1250 and data 1270. Computer system 1200 may include one or more of memory system 100, memory system 400, and memory system 600, or components that implement the methods or circuits, described herein. Processing system 1230 is operatively coupled to communication interface 1220 and user interface 1260. Computer system 1200 may comprise a programmed general-purpose computer. Computer system 1200 may include a microprocessor. Computer system 1200 may comprise programmable or special purpose circuitry. Computer system 1200 may be distributed among multiple devices, processors, storage, and/or interfaces that together comprise elements 1220-1270.

Communication interface 1220 may comprise a network interface, modem, port, bus, link, transceiver, or other communication device. Communication interface 1220 may be distributed among multiple communication devices. Processing system 1230 may comprise a microprocessor, microcontroller, logic circuit, or other processing device. Processing system 1230 may be distributed among multiple processing devices. User interface 1260 may comprise a keyboard, mouse, voice recognition interface, microphone and speakers, graphical display, touch screen, or other type of user interface device. User interface 1260 may be distributed among multiple interface devices. Storage system 1240 may comprise a disk, tape, integrated circuit, RAM, ROM, EEPROM, flash memory, network storage, server, or other memory function. Storage system 1240 may include computer readable medium. Storage system 1240 may be distributed among multiple memory devices.

Processing system 1230 retrieves and executes software 1250 from storage system 1240. Processing system 1230 may retrieve and store data 1270. Processing system 1230 may also retrieve and store data via communication interface 1220. Processing system 1230 may create or modify software 1250 or data 1270 to achieve a tangible result. Processing system 1230 may control communication interface 1220 or user interface 1260 to achieve a tangible result. Processing system 1230 may retrieve and execute remotely stored software via communication interface 1220.

Software 1250 and remotely stored software may comprise an operating system, utilities, drivers, networking software, and other software typically executed by a computer system. Software 1250 may comprise an application program, applet, firmware, or other form of machine-readable processing instructions typically executed by a computer system. When executed by processing system 1230, software 1250 or remotely stored software may direct computer system 1200 to operate.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory controller, comprising:
a first interface to transmit a first plurality of groups of data bits to be stored in a memory array of a DRAM device in response to a write command transmitted by the memory controller to the DRAM device;

a second interface to transmit a first plurality of data mask signals each coincident with a respective one of the first plurality of groups of data bits, and to transmit a second plurality of data mask signals, each of the first plurality of data mask signals indicating that the respective one of the first plurality of groups of data bits transmitted coincident with the corresponding one of the first plurality of data mask signals is not to be masked;

the DRAM device to merge the first plurality of groups of data bits with at least one group of data bits received from the memory array to generate a merged group of data bits, each of the second plurality of data mask signals indicating that a respective at least one group of data bits received from the memory array is to be merged with the first plurality of groups of data bits;

the DRAM device to generate a first group of check bits based on the merged group of data bits; and, the DRAM device to store the merged group of data bits and the first group of check bits in the memory array.

2. The memory controller of claim 1, wherein the DRAM device is to receive, from the memory array, a second group of data bits and a second group of check bits, and the DRAM device is to, based on the second group of data bits and the second group of check bits, correct an error in the second group of data bits to produce a third group of data bits, and DRAM device is to transmit the third group of data bits to the first interface in response to a read command transmitted by the memory controller.

3. The memory controller of claim 2, wherein the DRAM device is to receive, from the memory array, a fourth group of data bits.

4. The memory controller of claim 3, wherein the first group of check bits is further based on the fourth group of data bits.

5. The memory controller of claim 2, wherein the second interface is to receive a third group of check bits generated by the DRAM device based on the third group of data bits.

6. The memory controller of claim 1, wherein the DRAM device is to receive, from the memory array, the at least one group of data bits received as read from the memory array.

7. The memory controller of claim 6, wherein the DRAM device is to not correct an error in the at least one group of data bits as read from the memory array.

8. A memory controller, comprising:

a first interface to transmit, to a DRAM device and in association with a write command, a plurality of data mask signals each coincident with a first plurality of groups of data bits transmitted, to the DRAM device, via a second interface;

the DRAM device to, based on the plurality of data mask signals, selectively generate a merged group of data bits having zero or more groups of data bits received from a memory array of the DRAM device and one or more groups of the first plurality of groups of data bits received by the DRAM device via the second interface;

the DRAM device to generate a first group of check bits based on the merged group of data bits; and, the DRAM device to write the merged group of data bits in association with the group of check bits.

9. The memory controller of claim 8, wherein the DRAM device is to, based on the merged group of data bits and the first group of check bits as read from the memory array, correct an error in at least one of the merged group of data bits and the first group of check bits.

10. The memory controller of claim 9, wherein, in response to a read command transmitted by the memory controller, the DRAM device is to transmit the merged group of data bits to the second interface.

11. The memory controller of claim 10, wherein, in response to the read command, the DRAM device is to transmit the merged group of check bits via the first interface.

12. The memory controller of claim 8, wherein the DRAM device is to, based on the merged group of data bits and the first group of check bits as read from the memory array, not alter the merged group of data bits and the first group of check bits as read from the memory array.

13. The memory controller of claim 8, wherein the DRAM device is to generate the first group of check bits based on a Hamming code.

14. The memory controller of claim 8, wherein, the first interface is to transmit a second group of check bits associated with an unmasked write command transmitted by the memory controller.

15. A method of operating a memory controller, comprising:

transmitting, from a first interface and associated with a write command, a first plurality of groups of data bits to be stored in a memory array of a DRAM device;

transmitting, from a second interface and associated with the write command, a first plurality of data mask signals each coincident with a respective one of the first plurality of groups of data bits, each of the first plurality of data mask signals indicating that the respective one of the first plurality of groups of data bits received coincident with the corresponding one of the first plurality of data mask signals is not to be masked; and the DRAM device to merge the first plurality of groups of data bits with at least one group of data bits received from the memory array to generate a merged group of data bits, each of the second plurality of data mask signals indicating that a respective at least one group of data bits received from the memory array is to be merged with the first plurality of groups of data bits, the DRAM device to generate a first group of check bits based on the merged group of data bits, and the DRAM device to store the merged group of data bits and the first group of check bits in the memory array.

16. The method of claim 15, wherein the DRAM device receives a second group of data bits and a second group of check bits read from the memory array and, based on the second group of data bits and the second group of check bits, corrects an error in the second group of data bits to produce a third group of data bits.

17. The method of claim 16, further comprising:

transmitting a read command, wherein, in response to a read command, the DRAM device transmits the third group of data bits.

18. The method of claim 17, wherein the DRAM device receives a fourth group of data bits read from the memory array.

19. The method of claim 18, wherein the first group of check bits is further based on the fourth group of data bits.

20. The method of claim 19, wherein the DRAM device receives the first group of data bits and the first group of check bits from the memory array and, based on the first group of data bits and the first group of check bits as received from the memory array, determines that the first group of data bits does not need to be corrected before being transmitted via the first interface.

* * * * *